Nov. 14, 1944.  H. F. SCHMIDT  2,362,667

THRUST BEARING

Filed May 15, 1942  3 Sheets-Sheet 1

INVENTOR
HENRY F. SCHMIDT.
BY
a. B. Reavis
ATTORNEY

Nov. 14, 1944.  H. F. SCHMIDT  2,362,667
THRUST BEARING
Filed May 15, 1942  3 Sheets-Sheet 2
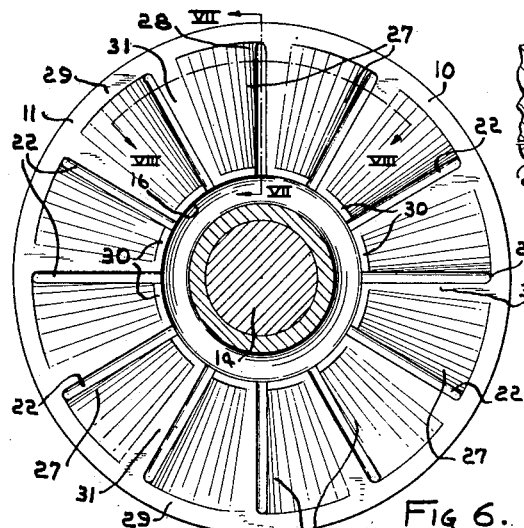
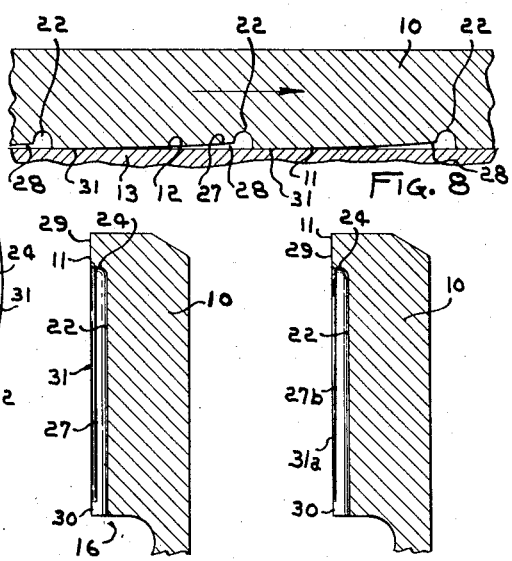
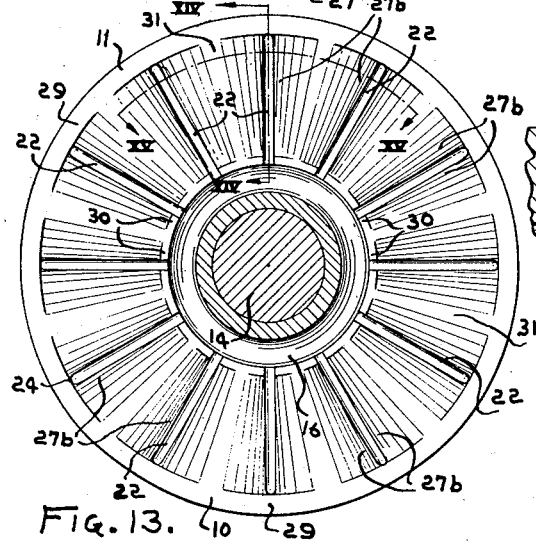
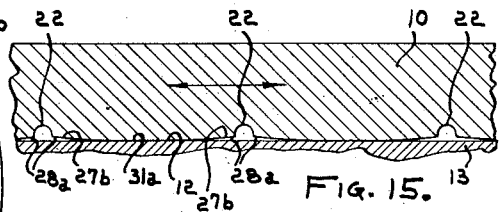
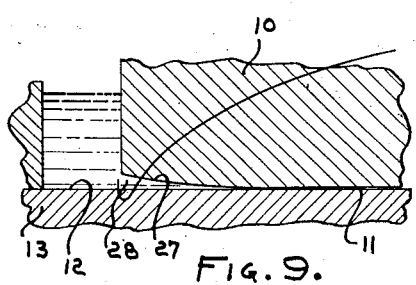
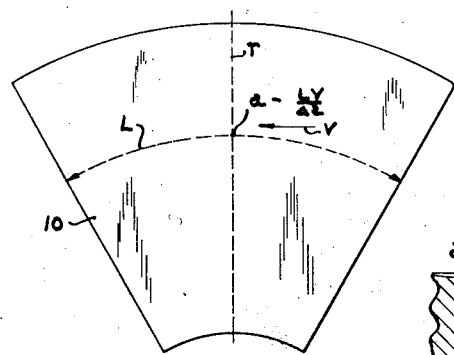
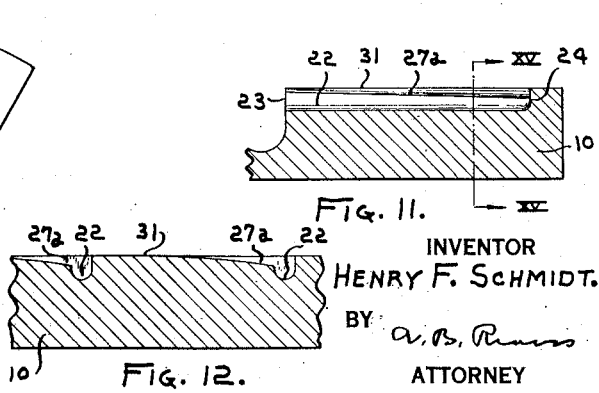
INVENTOR
HENRY F. SCHMIDT.
BY
ATTORNEY Nov. 14, 1944.   H. F. SCHMIDT   2,362,667
THRUST BEARING
Filed May 15, 1942   3 Sheets-Sheet 3
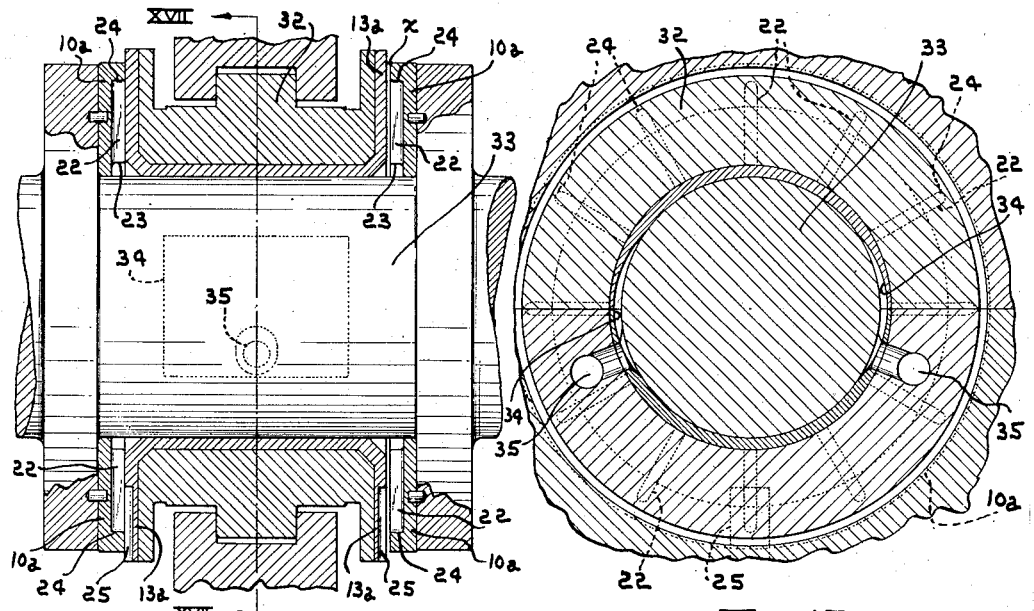
Fig. 16.
Fig. 17.
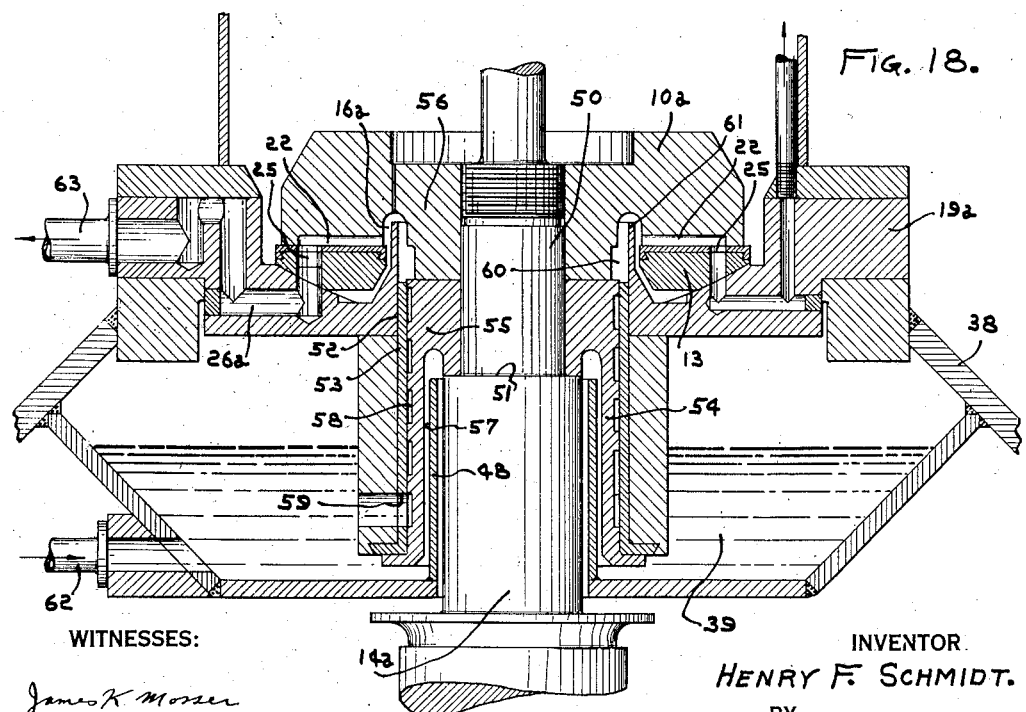
Fig. 18.
WITNESSES:
James K. Mosser
E. H. Lutz
INVENTOR.
HENRY F. SCHMIDT.
BY
A. B. Reavis
ATTORNEY Patented Nov. 14, 1944

2,362,667

UNITED STATES PATENT OFFICE 2,362,667

THRUST BEARING

Henry F. Schmidt, Lansdowne, Pa., assignor to Westinghouse Electric & Manufacturing Company, East Pittsburgh, Pa., a corporation of Pennsylvania Application May 15, 1942, Serial No. 443,051

6 Claims. (Cl. 308—160)

The invention relates to a thrust bearing including stationary and rotary members and it has for an object to utilize the rotary member to provide rotating wedge films of oil between the bearing surfaces.

A further object of the invention is to provide a thrust bearing of the above character wherein the oil constituting each wedge film is removed and the film is reformed one or more times for each revolution of the rotary member.

A further object of the invention is to provide the rotary member or collar of a thrust bearing with radially-extending grooves formed in the bearing surface and closed at their outer ends so that, with oil supplied to the inner ends thereof, pressure of oil due to centrifugal force will be developed in the grooves to provide films separating the bearing surfaces.

Yet another object of the invention is to provide the stationary member or collar of the thrust bearing with a recess or groove having its outer end open to the space external to the bearing surfaces and having its inner end arranged to communicate successively with the outer ends of the radially-extending grooves of the rotary member or collar so that the impeller or centrifugal effect of each radially-extending groove is effective to produce flow during the period of communication in order to flush or clean out the grooves.

A further object of the invention is to recess the rotary collar or member so as to provide surfaces which, with respect to the stationary bearing surface, converge rearwardly from the trailing sides of radially-extending grooves formed in the collar or member.

Another object of the invention is to recess a rotary member or collar to provide surfaces at each side of each radially-extending groove formed therein and which surfaces are inclined in opposite directions from the sides of each groove and which converge in directions outwardly from the latter and with respect to the stationary bearing surface.

A further object of the invention is to recess the rotary member or collar of a thrust bearing so as to provide wedge-shaped spaces opening into trailing sides of radially-extending grooves formed in the collar and converging rearwardly from the trailing edges of the grooves, recessing being effected in such a manner that the wedge-shaped spaces increase in depth along radial lines approximately as the radius in order to provide for approximately constant film pressure along each radial line.

A further object of the invention is to provide a combined radial and thrust bearing wherein oil for lubricating the bearings is first supplied to the radial bearing and is discharged from the latter to lubricate the thrust bearing.

These and other objects are effected by the invention as will be apparent from the following description and claims taken in connection with the accompanying drawings, forming a part of this application, in which:

Fig. 6 is a view similar to Fig. 2 but showing the collar recessed to provide for wedge-shaped oil film spaces;

Fig. 7 is an enlarged sectional view taken along the line VII—VII of Fig. 6;

Fig. 8 is an enlarged arcuate sectional view, taken along the line VIII—VIII of Fig. 6;

Fig. 9 is a view explanatory of wedge film phenomena;

Figs. 10, 11 and 12 are details illustrative of deepening of film space in an outward radial direction.

Fig. 13 is a view similar to Fig. 6 but showing recessing so as to provide for wedge-shaped spaces opening into each side of each radially-extending groove;

Fig. 14 is a sectional view taken along the line XIV—XIV of Fig. 13;

Fig. 15 is an arcuate sectional view taken along the lines XV—XV of Figs. 11 and 13;

Fig. 16 is a longitudinal sectional view of a combined radial and double-acting thrust bearing;

Fig. 17 is a transverse sectional view taken along the line XVII—XVII of Fig. 16; and, Fig. 18 is a sectional view showing a further form of the thrust bearing.

Figure 1:
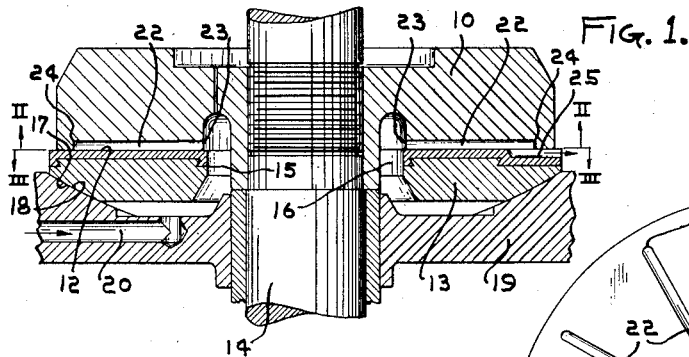
Fig. 1 is a sectional view of one form of the improved thrust bearing.
Figure 2:
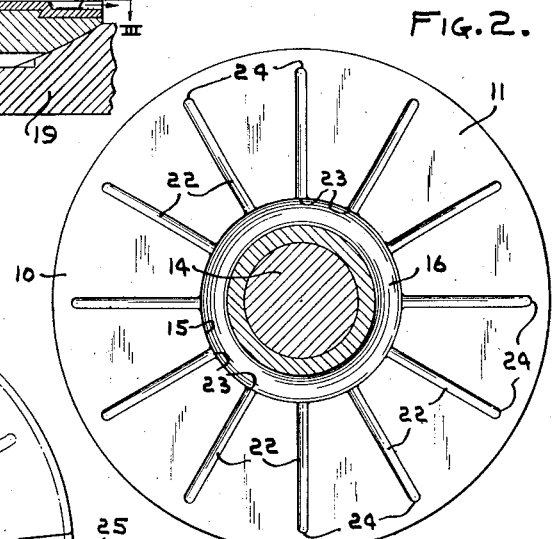
Fig. 2 is a plan of the rotary collar as viewed from the bearing surface side.
Figure 3:
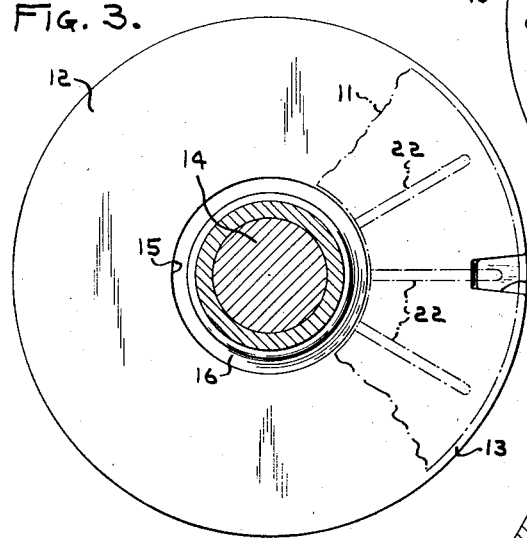
Fig. 3 is a plan of the stationary collar as viewed from the bearing surface side.

In Figs. 1, 2 and 3 there is shown a thrust bearing including a rotary member or collar 10 having a bearing surface 11 cooperating with the bearing surface 12 of the stationary member or collar 13.

As shown, the rotary member or collar 10 is carried by a shaft 14 and the stationary member 13 is of annular form, it having a central opening 15 through which the shaft 14 extends and the wall of the opening defining, with respect to the shaft, an annular space 16 to which oil is supplied in any suitable manner.

As shown, the stationary collar 13 has a spherical seat 17 fitting a spherical seat 18 provided on supporting structure 19, and the latter is provided with a passage 20 for supplying oil to the space 16.

The rotating collar 10 has radially-extending grooves 22 formed in the bearing surface 11 thereof, the inner ends 23 of the grooves being open to the oil supply space 16 and the outer ends 24 thereof being closed or restricted due to the fact that the grooves terminate short of the periphery of the collar.

Assuming that the space 16 is maintained filled with oil so that the latter may enter the inner ends of the grooves 22, then, with rotation of the collar 10, each groove will serve as an impeller passage to develop pressure, the pressure varying as the square of velocity of any point along the groove; and, of course, the pressure will increase as the speed is increased. There is thus provided between the stationary and rotary collars a body of oil under pressure tending to separate the bearing surfaces; and, as a consequence, oil films out from the sides of the grooves to provide a layer separating the bearing surfaces, thereby providing a lubricated fluid support for the rotary member or collar of the bearing.

To avoid the accumulation of any foreign matter in the grooves 22, or possible clogging of the latter, provision is made for periodic flushing of each groove. To this end, the stationary member or collar 13 has a groove or recess 25 formed so that its outer end is open to the space outside of the bearing and its inner end is adapted to communicate successively with the outer ends of the grooves 22 as the rotary collar rotates. During the period of communication of a radially-extending groove 22 with the clean-out groove or recess 25, the impeller action of the groove is then effective to produce high velocity of oil outwardly to clean or flush out the groove. A further advantage for this feature is to limit the temperature of the oil and particularly that of the film provided thereby, as the oil in each groove 22 is removed and the groove is refilled with fresh oil at least once for each revolution of the rotary collar.

Figure 4:
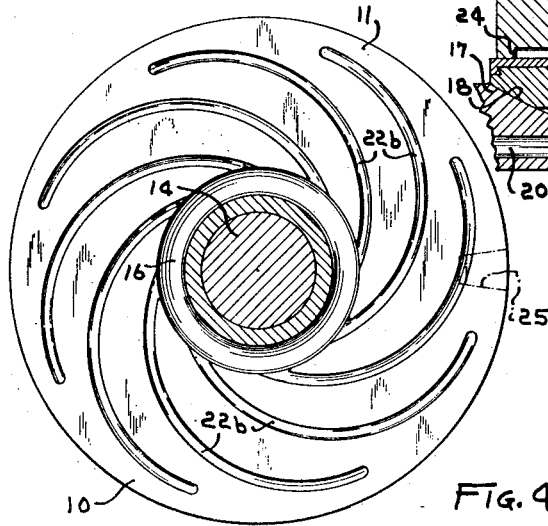
Fig. 4 is a view similar to Fig. 2 but showing a modified arrangement of grooves.

In Fig. 4, instead of radial grooves, the rotary collar 10 is provided with spiral grooves 22b. As the spiral formation has a component of radial extent, it has the capacity of creating pressure due to centrifugal force; and, because of the spiral formation, it also has the capability of building up pressure on account of the viscosity pumping effect. Not only does viscosity pumping make it possible to provide for the development of very high oil pressures but it is also more effective than the radial form of groove to maintain the desired pressure at low speeds. The spiral slope of the grooves directs material for collection into the grooves and assures of such material being carried to the outer ends thereof. As the outer ends of the grooves communicate with one or more blow-out recesses 25 formed in the stationary collar 13, material collecting in the grooves will be flushed or blown out at least once for each revolution of the rotary collar.

Figure 5:
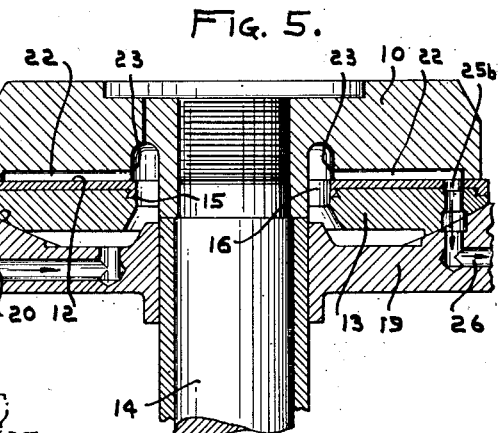
Fig. 5 is a view similar to Fig. 1 but showing a modified discharge arrangement.

In Fig. 5, the arrangement is the same as in Fig. 1 except that the blow-out recess is provided by a pocket 25b formed in the stationary collar 13 and communicating with a discharge passage 26 shown as being formed both in the stationary collar and in the supporting structure 19. The inlet and discharge passages 20 and 26 may be connected to oil lines of any suitable circulating system.

The rotary collar grooves so far described function, due to centrifugal force, to provide a "pumped pressure" which at high peripheral speeds may be adequate to provide a supporting film; however, for higher pressures or lower peripheral speeds, it is necessary to supplement the "pumped pressure" with "film pressure" to provide a lubricating film sufficient for the load. By "film pressure" is means the pressure created internally of the film and varying as $$\frac{LV}{\Delta 2} \times \text{viscosity}$$

where L is the film length, V is the tangential velocity and $\Delta$ is the film thickness. However, in order that these factors may be utilized to provide a film of adequate thickness, it is necessary that oil be supplied to the film entrances at sufficient pressure; and, as hereinafter more fully pointed out, the centrifugal effect of the radial grooves is more than sufficient for this purpose at any speed. As neither the stationary nor rotary collars employs segmental shoes, the tilting effect of the latter, ordinarily relied upon in order that wedge films may be formed, is absent and it is necessary to relieve or recess the rotary collar so that the surfaces thereof may cooperate with the bearing surface of the other collar to provide a circumferential series of wedge-shaped spaces, such spaces being so formed as to open into the trailing sides of the grooves and to converge rearwardly therefrom so as to accommodate wedge films of oil separating the rotary and stationary bearing collars.

Preferably, as shown in Figs. 6, 7 and 8, the rotary collar is relieved or recessed to provide surfaces 27, which, with respect to the cooperating stationary bearing surface 12, converge rearwardly from the trailing sides of the radially-extending grooves 22 to define wedge-shaped spaces 28 opening into the grooves at the trailing sides of the latter and converging rearwardly therefrom along arcuate sections, each inclined surface 27 being bounded by outer and inner walls 29 and 30 and a back wall 31, the walls being elements of the rotating collar bearing surface.

With a wedge-film bearing where the oil is supplied to the entrance under a fixed head, for example, atmospheric pressure, there is a limit, dependent upon the head, to the mean velocity of oil in the film. Referring to diagrammatic Fig. 9, assume that the collar 10 is moving at the section at a velocity of 94 feet per second and that the cooperating collar or shoe 13 is stationary. Molecules of oil in contact with the rotary collar move therewith and those in contact with the stationary collar or shoe remain stationary. From this, it follows that the mean velocity of oil in the film is 47 feet per second; and, to secure this velocity, there is required a pressure of 15 pounds per square inch (atmospheric). If the pressure (15 pounds per square inch) remains the same and the collar velocity is increased above 94 feet per second, the pressure no longer gives a velocity corresponding to the mean velocity and the film becomes thinner and thinner as the collar velocity is further increased. Therefore, there is a practical collar velocity fixed by the pressure at which a complete oil film is established.

The necessity of supplying oil to the entrance at adequate pressure will be clear from the consideration of Fig. 9. The entrance edge of the wedge-shaped space 28 may be regarded as defining an orifice through which the oil must pass in order to enter the space, and the pressure must be high enough to create a velocity in the film such that the latter will be maintained at the maximum operating speed of the collar.

The present invention is not subject to the pressure limitation for the reason that the rotary collar functions as an impeller to provide oil under pressure for the wedge space entrance; and, as such pressure is a function of collar speed, the oil velocity limitation imposed by a fixed pressure does not occur, with the result that the collar speed is not restricted on this account.

In a radial groove functioning as an impeller passage with the outer end closed or restricted, the head created at any point is equal to $$\frac{V^2}{2g}$$

Since the mean film velocity is equal to one-half the surface velocity of the rotating collar and the head varies as $$V^2 \text{ and } \left(\frac{V}{2}\right)^2 = \frac{V^2}{4}$$

the head generated is four times that required to establish a full oil film.

While the relief may have any suitable depth or variation thereof along radial lines, preferably the depth increases with increase in radius so as to secure uniform pressures along radial lines. Referring to Figs. 10, 11 and 12, and assuming constant viscosity of oil, the pressure at any point (point "a" of Fig. 10) in the film varies as $$\frac{LV}{\Delta 2}$$

where L is the wedge surface length at the radius at the point, V is the tangential velocity of the moving collar at the point and $\Delta$ is the film thickness. From $$\frac{LV}{\Delta 2}$$

$\Delta$ varies inversely as the square root of the pressure; and, to secure uniform pressures along radial lines (for example, line "r" of Fig. 10), the recess depth varies approximately as the radius, that is, the depth increases as the radius increases, this being diagrammatically indicated in Figs. 11 and 12, Fig. 12 showing a face 27a inclined toward the trailing side of each groove 22, as already described in connection with Fig. 6, and inclined outwardly radially to provide for increase in depth with increase in radius.

In Figs. 13, 14 and 15, there is shown a reversible thrust bearing moving collar 10 having the sector thereof between radial grooves 22 relieved or recessed to provide faces 27b which are oppositely inclined and which cooperate with the stationary collar to define wedge-shaped spaces 28a opening into each side of each groove, the inclined faces 27b of each sector being separated by an intermediate portion 31a, which is flush with the bearing surface of the stationary collar.

In Figs. 16 and 17 there is shown a combined radial and double-acting thrust bearing. In these views, the radial bearing 32 has a journal 33 disposed therein, the bearing housing being provided with stationary bearing collars 13a at either end thereof and the journal or shaft 33 having attached thereto rotary collars 10a arranged outside of the stationary collars 13a. Oil is supplied in any suitable manner substantially midway of the length of the bearing 32 and is distributed laterally so as to thoroughly lubricate the radial bearing, oil escaping from the ends of the latter entering the thrust bearing formed by the co-operating collars to provide for lubrication thereof. The oil supply means for the radial bearing in Figs. 16 and 17 is shown as including the spaces 34 and the passages 35 communicating therewith.

As shown, the rotary collars 10a are provided with radially-extending grooves 22, the inner ends of the grooves being open to the ends of the journal bearing so as to be supplied with oil thereby and the outer ends of the grooves being closed as already pointed out. The centrifugal head or pressure of oil generated in the radially-extending grooves 22 is effective to provide a film of oil separating the cooperating thrust bearing surfaces. To assure of flushing of the grooves, the stationary collars 13a have clean-out recesses 25.

With the double-acting arrangement of thrust bearings, as shown in Figs. 16 and 17, there should be sufficient clearance so that, with the thrust in one direction, the inactive thrust bearing will be rendered ineffective so far as pressures are concerned, that is, the rotating collar of the inactive thrust bearing would be separated from the stationary collar thereof a distance sufficient to prevent the development of pressures in the radially-extending grooves thereof. The clearance "x" of Fig. 16 serves this purpose.

As oil supplied to the radial bearing 32 enters central chambers or spaces 34; and, from the spaces, the oil is well distributed in any well-known manner to lubricate the radial bearing, the oil flowing continuously in opposite directions and the ends of the lubricating films issuing from the ends of the radial bearing. This manner of discharge of oil from the ends of the radial bearing provides for metering of the supply of oil to the thrust bearings, with the result that, should one of the thrust bearings be inactive with the rotary and stationary collars thereof separated, as already pointed out, the metered discharge of oil from each end of the radial bearing will assure of the active thrust bearing being supplied adequately with oil.

In Fig. 18, the stationary structure 19a for the stationary bearing collar 13 has attached thereto the depending casing 38 forming an oil reservoir 39, the casing having a central and upwardly-extending sleeve 48 encompassing the shaft 14a attached to the rotary bearing collar 10a, the sleeve extending upwardly a suitable distance to maintain a desired oil level in the reservoir. As shown, the upper end of the spindle 14a has a reduced portion 50 providing the shoulder 51. The stationary structure has a central opening 52 larger than the spindle and through which the latter extends. A sleeve 53 has its upper end tightly fitting within the opening 52 and it depends into the reservoir 39, the sleeve being of larger internal diameter than the spindle. A sleeve 54 closely fits and is rotatable within the sleeve 53 and it has a hub portion 55 held in tight engagement with the shoulder 51 by the hub portion 56 of the rotatable collar 10a. The inner sleeve 55 also depends into the reservoir and it is counterbored or relieved, as indicated at 57, to telescope freely over the upwardly-extending sleeve 48. A helical groove 58 is formed in the exterior of the sleeve 54 and it cooperates with the internal surface or bore of the sleeve 53 to form a viscosity pumping groove, the sleeve 53 having an opening 59 near the lower portion thereof providing an inlet open to the reservoir and communicating with the helical viscosity pumping groove. Thus, in addition to the sleeves providing a journal or steady bearing for the shaft, the bearing surfaces are formed to provide a viscosity pump to assure of lubrication of the bearing and of a supply of oil issuing therefrom for the purpose immediately to be described. Oil discharged from the upper end of the viscosity groove into the space 60 flows over the cylindrical dam 61 into the space 16a communicating with the inner ends of the radial grooves 22. As in Fig. 5, the outer ends of the radial grooves are arranged to communicate successively with the discharge passage 26a. The reservoir or casing 38 has a supply conduit 62 and the discharge passage 26a is connected to a discharge or return conduit 63. As the radial grooves 22 are capable of developing substantial pressure of oil, it will be apparent that the discharge conduit 63 may be connected to any suitable apparatus, for example, a cooler, the pressure developed in the radial grooves being relied upon to insure of circulation through any such apparatus and for return of oil from the latter to the passage 62 communicating with the reservoir 39.

While the invention has been shown in several forms, it will be obvious to those skilled in the art that it is not so limited, but is susceptible of various other changes and modifications without departing from the spirit thereof, and it is desired, therefore, that only such limitations shall be placed therepon as are specifically set forth in the appended claims.

What is claimed is:

1. In a thrust bearing, a stationary member having a continuous annular bearing surface, a rotary member having a bearing surface cooperating with the first bearing surface, said rotary member having a plurality of passages formed therein for supplying oil to said bearing surfaces, each of said passages having a radial component of direction and terminating short of the periphery of the rotary member so as to have a closed outer end lapped by the stationary bearing surface, means for supplying the inner ends of the passages with oil, and means providing for flushing out the passages including one or more clean-out openings formed in the stationary member and with which the outer ends of the passages successively register.

2. In a thrust bearing, a stationary member having a continuous bearing surface, a rotary member having a bearing surface cooperating with the first bearing surface, means including an impeller provided by radially-extending grooves formed in the bearing surface of the rotary member for supplying oil to the bearing surfaces, means for restricting the escape of oil from the outer ends of the passages so that the impeller is effective to develop in the oil applied to the bearing surfaces pressure dependent upon the speed of the rotary member, and means including an opening formed in the stationary member with the opening so disposed that its outer end is continuously open to the space external to the bearing and its inner end is adapted to communicate successively with the outer ends of the radially extending passages as the rotary member rotates in order that the impeller action of each radial passage may be effective to flush the latter during the period of communication.

3. In a thrust bearing, means providing a stationary bearing surface, a rotary member having a bearing surface cooperating with the first surface, said rotary member having a plurality of grooves formed therein so as to intersect the bearing surface thereof and each groove having at least a radial component of extent so as to provide an outer end which is spaced from the bearing axis a greater distance than that of its inner end, means providing for oil being applied to the inner ends of the grooves, and means for restricting the escape of oil from the outer ends of the grooves, said stationary means having an opening whose outer end communicates with a space external to said bearing surfaces and whose inner end is arranged to communicate successively with the outer ends of said rotary member grooves as such outer ends pass thereover.

4. In a thrust bearing, a stationary collar having a bearing surface; a rotary collar having a bearing surface cooperating with the first surface; said rotary collar having a plurality of grooves formed therein so as to intersect the bearing surface thereof and each groove having at least a radial component of extent and said rotary collar being relieved to provide, with respect to the stationary bearing surface, wedge-shaped spaces which converge rearwardly and arcuately from the trailing sides of said grooves; means providing for oil being supplied to the inner ends of the grooves; means for restricting escape of oil from the outer ends of the grooves; and means providing for flushing out the grooves including one or more clean-out openings formed in the stationary collar and with which the outer ends of the grooves successively register.

5. In a reversible thrust bearing, a stationary collar having a bearing surface; a rotary collar having a bearing surface cooperating with the first surface; said rotary collar having a plurality of grooves formed therein so as to intersect the bearing surface thereof and each groove having at least a radial component of extent and said rotary collar being relieved to provide, with respect to the stationary bearing surfaces, wedge-shaped spaces open to opposite sides of each groove and which converge rearwardly and arcuately in relation to trailing groove sides; means providing for oil being supplied to the inner ends of the grooves; means for restricting escape of oil from the outer ends of the grooves; and means providing for flushing out the grooves including one or more clean-out openings formed in the stationary collar and with which the outer ends of the grooves successively register.

6. In a thrust bearing, means providing a stationary bearing surface; a rotary member having a bearing surface cooperating with the first surface; said rotary member having a plurality of grooves formed therein so as to intersect the bearing surface thereof and each groove having at least a radial component of extent and said rotary member being relieved to provide, with respect to the stationary bearing surface, wedge-shaped spaces which converge rearwardly along arcuate sections from the trailing edges of said grooves and which diverge outwardly along radial sections; said stationary means having an opening whose outer end communicates with space external to the bearing surfaces and whose inner end is arranged to communicate successively with the outer ends of the rotary member grooves as such outer ends pass thereover; means providing for oil being supplied to the inner ends of the grooves; and means for restricting escape of oil from the outer ends of the grooves.

HENRY F. SCHMIDT.